(12) United States Patent
Kwan et al.

(10) Patent No.: US 9,769,158 B2
(45) Date of Patent: Sep. 19, 2017

(54) GUIDED ENROLLMENT AND LOGIN FOR TOKEN USERS

(75) Inventors: Nang Kon Kwan, Mountain View, CA (US); John Magne, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 2016 days.

(21) Appl. No.: 11/448,158

(22) Filed: Jun. 7, 2006

(65) Prior Publication Data

US 2008/0005339 A1    Jan. 3, 2008

(51) Int. Cl.
*H04L 29/06* (2006.01)

(52) U.S. Cl.
CPC ...... *H04L 63/0853* (2013.01); *H04L 63/0428* (2013.01)

(58) Field of Classification Search
CPC .................. H04L 63/0853; H04L 63/0428
USPC ...... 726/9, 10, 20; 713/182–184; 705/64–67
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A * | 1/2000 | Maes et al. ................... 705/1.1 |
| 6,044,155 A | 3/2000 | Thomlinson et al. |

(Continued)

FOREIGN PATENT DOCUMENTS

| | | |
|---|---|---|
| WO | 9724831 | 7/1997 |
| WO | 0048064 A1 | 8/2000 |
| WO | 2007096590 A1 | 8/2007 |

OTHER PUBLICATIONS

U.S. Appl. No. 11/446,956, Christina Fu et al., filed Jun. 6, 2006.

(Continued)

*Primary Examiner* — John B King
(74) *Attorney, Agent, or Firm* — Lowenstein Sandler LLP

(57) ABSTRACT

Embodiments of the present invention provide an automated process for enrolling and logging in with a token. In particular, a security client detects when the user has inserted their token. In response, the security client then notifies the enterprise security system and provides information about the token. The enterprise security system performs a profile lookup and authorizes use of the token.

9 Claims, 15 Drawing Sheets

(56) References Cited

U.S. PATENT DOCUMENTS

| | | | |
|---|---|---|---|
| 6,067,621 A * | 5/2000 | Yu | G06F 21/34 713/168 |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1 | 4/2002 | Kennedy et al. | |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,072,354 B1 * | 7/2006 | Beathard | H04L 63/10 370/447 |
| 7,085,386 B2 | 8/2006 | Audebert et al. | |
| 7,113,594 B2 * | 9/2006 | Boneh et al. | 380/28 |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,412,420 B2 * | 8/2008 | Holdsworth | 705/44 |
| 7,437,757 B2 * | 10/2008 | Holdsworth | 726/9 |
| 7,451,921 B2 | 11/2008 | Dowling et al. | |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 | 3/2009 | Snible et al. | |
| 7,512,800 B2 * | 3/2009 | Hopkins | G06Q 20/02 380/30 |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,822,635 B1 * | 10/2010 | Brown | G06Q 30/02 705/14.1 |
| 7,860,243 B2 | 12/2010 | Zheng et al. | |
| 8,412,927 B2 * | 4/2013 | Kwan | H04L 9/0822 380/278 |
| 8,683,196 B2 * | 3/2014 | Fu | H04L 63/0823 705/44 |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0023059 A1 * | 2/2002 | Bari | G06F 21/41 705/76 |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0080958 A1 | 6/2002 | Ober et al. | |
| 2002/0095588 A1 * | 7/2002 | Shigematsu et al. | 713/186 |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1 | 1/2003 | Kim et al. | |
| 2003/0028664 A1 * | 2/2003 | Tan et al. | 709/237 |
| 2003/0035548 A1 | 2/2003 | Kwan | |
| 2003/0056099 A1 | 3/2003 | Asanoma et al. | |
| 2003/0061170 A1 * | 3/2003 | Uzo | 705/64 |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 | 9/2003 | Schneck et al. | |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 * | 8/2004 | Cross et al. | 705/59 |
| 2004/0230831 A1 | 11/2004 | Spelman et al. | |
| 2005/0022123 A1 | 1/2005 | Costantino | |
| 2005/0033703 A1 | 2/2005 | Holdsworth | |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 * | 6/2005 | Le Saint | 713/185 |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |

(56) References Cited

U.S. PATENT DOCUMENTS

| | | | |
|---|---|---|---|
| 2006/0291664 A1 | 12/2006 | Suarez et al. | |
| 2006/0294583 A1 | 12/2006 | Cowburn et al. | |
| 2007/0014416 A1 | 1/2007 | Rivera et al. | |
| 2007/0016943 A1* | 1/2007 | M'Raihi et al. | 726/9 |
| 2007/0074034 A1 | 3/2007 | Adams et al. | |
| 2007/0112721 A1 | 5/2007 | Archbold et al. | |
| 2007/0113267 A1 | 5/2007 | Iwanski et al. | |
| 2007/0113271 A1 | 5/2007 | Pleunis | |
| 2007/0118891 A1 | 5/2007 | Buer | |
| 2007/0150942 A1* | 6/2007 | Cartmell | G06F 21/34 726/5 |
| 2007/0162967 A1 | 7/2007 | de Jong et al. | |
| 2007/0169084 A1 | 7/2007 | Frank et al. | |
| 2007/0189534 A1 | 8/2007 | Wood et al. | |
| 2007/0204333 A1 | 8/2007 | Lear et al. | |
| 2007/0226150 A1* | 9/2007 | Pietrzak | G06Q 30/02 705/59 |
| 2007/0230706 A1 | 10/2007 | Youn | |
| 2007/0271601 A1 | 11/2007 | Pomerantz | |
| 2007/0277032 A1 | 11/2007 | Relyea | |
| 2007/0280483 A1 | 12/2007 | Fu | |
| 2007/0282881 A1 | 12/2007 | Relyea | |
| 2007/0283163 A1 | 12/2007 | Relyea | |
| 2007/0283427 A1* | 12/2007 | Gupta et al. | 726/9 |
| 2007/0288745 A1 | 12/2007 | Kwan | |
| 2007/0288747 A1 | 12/2007 | Kwan | |
| 2008/0019526 A1 | 1/2008 | Fu | |
| 2008/0022086 A1 | 1/2008 | Ho | |
| 2008/0022088 A1 | 1/2008 | Fu et al. | |
| 2008/0022121 A1 | 1/2008 | Fu et al. | |
| 2008/0022122 A1 | 1/2008 | Parkinson et al. | |
| 2008/0022128 A1 | 1/2008 | Proudler et al. | |
| 2008/0034216 A1 | 2/2008 | Law | |
| 2008/0046982 A1 | 2/2008 | Parkinson | |
| 2008/0056496 A1 | 3/2008 | Parkinson | |
| 2008/0059790 A1 | 3/2008 | Parkinson | |
| 2008/0059793 A1 | 3/2008 | Lord et al. | |
| 2008/0069338 A1 | 3/2008 | Relyea | |
| 2008/0069341 A1 | 3/2008 | Relyea | |
| 2008/0072283 A1 | 3/2008 | Relyea | |
| 2008/0077794 A1 | 3/2008 | Arnold et al. | |
| 2008/0077803 A1 | 3/2008 | Leach et al. | |
| 2008/0133514 A1 | 6/2008 | Relyea | |
| 2008/0148047 A1 | 6/2008 | Appenzeller et al. | |
| 2008/0189543 A1 | 8/2008 | Parkinson | |
| 2008/0209224 A1 | 8/2008 | Lord | |
| 2008/0209225 A1 | 8/2008 | Lord | |
| 2008/0229401 A1 | 9/2008 | Magne | |
| 2009/0003608 A1 | 1/2009 | Lee et al. | |
| 2009/0133107 A1 | 5/2009 | Thoursie | |
| 2010/0313027 A1 | 12/2010 | Taylor | |

OTHER PUBLICATIONS

U.S. Appl. No. 11/447,196, Christina Fu et al., filed Jun. 6, 2006.
U.S. Appl. No. 11/448,157, Nang Kon Kwan et al., filed Jun. 7, 2006.
U.S. Appl. No. 11/448,179, Nang Kon Kwan et al., filed Jun. 7, 2006.
U.S. Appl. No. 11/462,606, Nang Kon Kwan et al., filed Aug. 4, 2006.
"ATM and Credit Card Notification", Feb. 2005 (internet archive) pp. 1-2, www.theareplaces.com/infgdes/money.atmnotif.htm.
"AMD Announces Specification for Open Platform Management Architecture", Feb. 28, 2005, pp. 1-2, http://www.thefreelibrary.com/AMD+Announces+Specification+for+Open+Platform+Management+Architecture-a0129342307.
Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.
Schneier, "Applied Cryptography: Protocols, Algorithms, and Source Code in C", 1996, John Wiley & Sons, Inc., Second Edition, pp. 455-456.
Zuccherato, Robert, "Elliptic Curve Cryptography Support in Entrust", May 9, 2000.
Red Hat Certificate System, http://www.redhat.com/f/pdf/rhas/DirSecProductSheetCertificateSystem.pdf, Jun. 2005.
PKCS#11 v2.20: Cryptographic Token Interface Standard, RSA Laboratories, Jun. 28, 2004, (see, e.g. Chapter 10, Objects) (see www.rsasecurity.com, 407 pgs).
Cryptographic Message Syntax, R. Housley, Request for Comments (RFC) 2630, Network Working Group, The Internet Society, Jun. 1999.
Balfanz (Dirk ABalfanz, "Access Control for Ad-Hoc Collaboration", Princeton University Jan. 2001).
Schneier, Bruce. Applied Cryptography, Second Edition. 1996 John Wiley and Sons, pp. 480-481.

* cited by examiner

GUIDED ENROLLMENT AND LOGIN FOR TOKEN USERS

RELATED APPLICATIONS

This application is related to pending U.S. patent application Ser. No. 11/446,956, entitled "Methods and Systems For Key Escrow" filed Jun. 6, 2006 and commonly assigned, U.S. patent application Ser. No. 11/447,196, entitled "Methods And Systems For Secure Key Delivery," filed Jun. 6, 2006 and commonly assigned, U.S. patent application Ser. No. 11/462,606, entitled "Methods And Systems for Managing Identity Management Security Domains," filed Aug. 4, 2006 and commonly assigned, and U.S. patent application Ser. No. 11/448,179, entitled "Profile Framework for Token Processing System," filed Jun. 6, 2006 and commonly assigned.

FIELD

This invention generally relates to secure client-server systems. More particularly, the invention relates to-enrolling and using a token.

DESCRIPTION OF THE RELATED ART

Although smart cards are often compared to hard drives, they are "secured drives with a brain"—they store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

However, there are drawbacks and disadvantages to smart cards. Typically, smart cards require sophisticated systems to support the management of their security information. For example, in order to enroll a smart card, numerous tasks, such as generating keys and obtaining certificates, must be performed. These tasks can be complex and difficult to perform. In addition, if a user loses or has the smart card, the user cannot access the information. The user may obtain a replacement smart card for access, but the system administrator may have to perform a substantial number of tasks to allow the user to regain access to his original data.

Therefore, there is a need for efficiently enrolling a user and their smart cards. In addition, there is a need to enroll a user and their smart cards to accommodate various security policies and applications.

SUMMARY OF THE INVENTION

In accordance with one feature invention, a method of enrolling a token is provided. When the token has been coupled to a security client, input may be received from the user. The token is then automatically enrolled to authenticate the user, without further input by the user.

In accordance with another feature of the present invention, a method of accessing secured information is provided. When a request from a user for access to the secured information is received, it is detected when a token has been coupled to a security client. The user is then automatically authenticated based on information from the token, without further input from the user.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
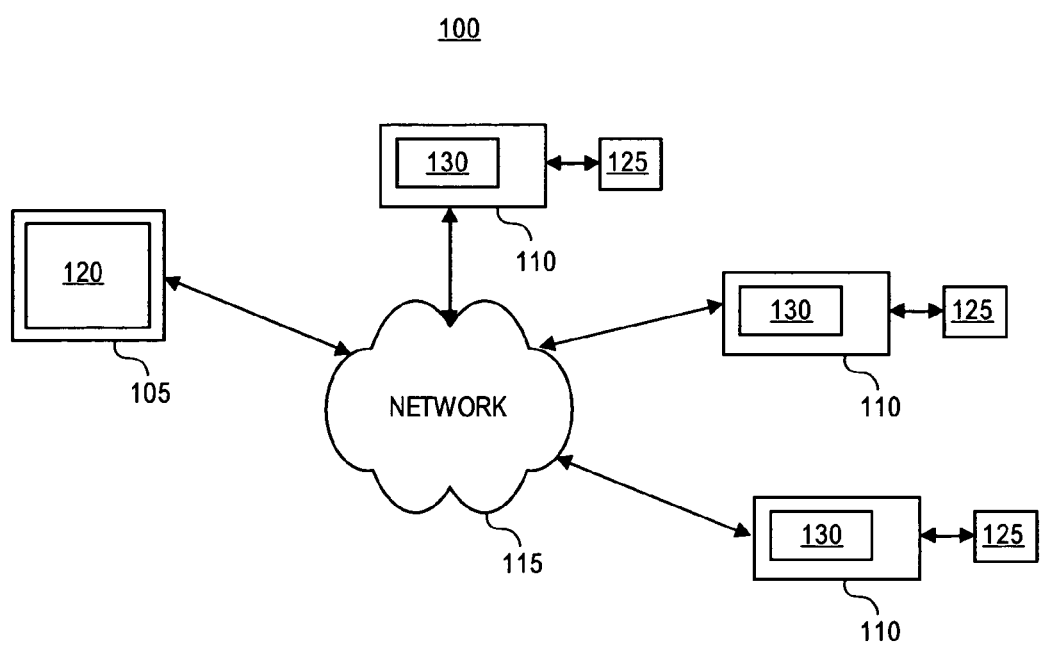
FIG. 1 illustrates an exemplary system in accordance with an embodiment.

Embodiments of the present invention provide an automated process for enrolling and logging in with a token. In particular, a security client detects when the user has inserted their token. In response, the security client then notifies the enterprise security system and provides information about the token. The enterprise security system performs a profile lookup and authorizes use of the token. Accordingly, other than inserting their token, the user may have virtually no further input needed of them.

Reference will now be made in detail to exemplary embodiments of the invention, which are illustrated in the accompanying drawings. Wherever possible, the same reference numbers will be used throughout the drawings to refer to the same or like parts. For simplicity and illustrative purposes, the principles of the present invention are described by referring mainly to exemplary embodiments thereof. However, one of ordinary skill in the art would readily recognize that the same principles are equally applicable to, and can be implemented in, all types of secure distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present invention generally relate to an enterprise security (ES) system executing on a server with a security client executing on a user desktop (erg., Windows, Linux, Mac). The security client may be configured to interface with the ES system and provide an interface to manage a smart card, communicate with ES system, act as a proxy for application program data units (APDUs) sent between the ES system and the smart card, and display user interfaces (UIs) as the ES system directs (for example, prompting user for credentials and/or PIN, displaying smart card status, etc.).

The ES system may include a token management system (TMS, or a security server). The TPS may be configured to act as the registration authority and to direct the entire enrollment process. The TPS may also be configured as the only entity in the ES system to construct the APDUs, which are the message format understood by the smart card. The TMS may interface with a token processing system (TPS) to a token key service (TKS) module, a data recovery manager (DRM) module and a certificate authority (CA) module through a firewall.

In various embodiments, smart cards (more generally tokens) may be configured to store an applet (a small application) and three keys. The three keys may be derived from a master key held by the manufacturer and the card identification number. The derivation of the keys may be implemented by applying a pre-defined function(s) to the master key and the card identification number. One of the keys may be a key encryption key, KEK. The security client may detect the presence of an inserted token in an associated card reader and inform TPS of the token.

The TPS may begin an initialization process that may include the TPS determining whether the applet on the token is outdated and whether the master key has changed since the three keys stored on the token were generated. If any of these conditions are true, the TPS may perform a "key update" in the event of the outdated master key and an "applet upgrade" in the event of outdated applet. As part of the update, the TPS may deliver new keys (derived within the TMS system from the new master key) and/or an updated applet to the token to be stored/injected therein.

The TPS may also determine that the token may need to be initialized with server-side generated keys and-key archival for those generated keys. More specifically, the TPS may be configured to provide tools that allow a system administrator to set policies to manage users. For example, the system administrator may set a policy where a group of users may have their tokens be enrolled with server-side key generation and key archival of those generated keys.

Accordingly, the security client may transmit a serial number, card unique identification, or card identification (CID) to the TPS of the TMS. The TPS may be configured to forward the CID of the token to the the TKS module. The TKS module may be configured to derive a series of keys based on the server master key and the CID. One of the derived keys is the key encryption key, KEK, which is configured to encrypt other secret keys. The TKS module is also configured to generate a key transport session key, KTSK. The TKS module may encrypt the key transport session key, KTSK, with the key encryption key, KEK, i.e., wrap, to arrive at a first encrypted or wrapped key transport session key, KEK(KTSK).

The TKS module may be initially configured to hold a public key of the DRM module, which for the sake of convenience will be referred as a server transport key, STK. The TKS module may include an encrypted secure database where the server transport key, STK, is stored. The TKS module may wrap the key transport session key, KTSK, with the server transport key, STK, to arrive at a second wrapped key transport session key, STK(KTSK). The TKS module may forward the first wrapped key transport session key, KEK(KTSK) and the second wrapped transport session key STK(KTSK) to the TPS.

The TPS may be configured to forward the second wrapped server transport key, STK(KTSK) and the server-side key generation request to the DRM module while temporarily holding the first wrapped key transport session key, KEK(KTSK). The DRM module may be configured to generate an asymmetric key pair, i.e., a subject public and a subject private (SPuK/SPrivK, respectively) key pair, where the subject may represent a user, device, or other entity such as organization, association, etc.

The DRM module may retrieve a storage key, SK, which may be a permanent private storage key owned by the DRM module and generate a storage session key, SSK. The DRM module may encrypt or wrap the subject private key, SPrivK, with the storage session key, SSK, to arrive at a wrapped storage private key, SSK(SPrivK). The DRM module may also encrypt the storage session key, SSK, with the storage key, SK, to arrive at a wrapped storage session key, SK(SSK). The wrapped storage private key, SSK(SPrivK) and the storage session key, SSK, may then be archived or escrowed by the DRM module. The archived keys (SSK (SPrivK) and SK(SSK)) may be used for later recovery in the event of a lost or destroyed token.

The DRM module may then decrypt, i.e., unwrap, the second wrapped transport session key, STK(KTSK), with the complementary key of the server transport key, STK, stored in the DRM module to retrieve the key transport session key, KTSK. The DRM module may then wrap the subject private key, SPrivK, with the key transport session key as a wrapped private key, KTSK(SPrivK) and forward the wrapped private key, KTSK(SPrivK) and the subject public key, SPuK, to the TPS.

The TPS may forward the wrapped private key, KTSK (SPrivK) and the first wrapped key transport session key, KEK(KTSK), to the security client to write into the token. The forwarded wrapped keys (KEK(KTSK) and KTSK (SPrivK)) are received at the token to be injected therein. For the sake of completeness, the token may execute an applet that can retrieve the key encryption key, KEK, which the manufacturer had derived and stored or the TMS has updated and stored Accordingly, the applet may unwrap the first wrapped key transport session key, KEK(KTSK) to retrieve the key transport session key, KTSK. The applet then uses the key transport session key to unwrapped the wrapped private key, KTSK(SPrivK) to retrieve the subject private key, SPrivK.

The TPS may be further configured to send a certificate enrollment request with the information regarding the subject public key, SPuK, to the CA module for certificates for the token. The TPS may subsequently forward received certificates from the CA module to the token. Subsequently, the certificates are written into the token.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a-multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform (machine) configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recovery keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token processing system 120 directs, i.e., prompting the user for credentials and/or PIN, displaying token status.

In some embodiments, the token management 120 may initiate token enrollment. The security client 130 may detect the presence of the inserted security token and notifies the token management system 120. The token-management 120 may prompt the security client 130 to display a user interface querying the user to begin the enrollment process. The security client 130 may forward a card identification (CID) of the token. The CID uniquely identifies the token and is set during the manufacture of the token.

Figure 2:
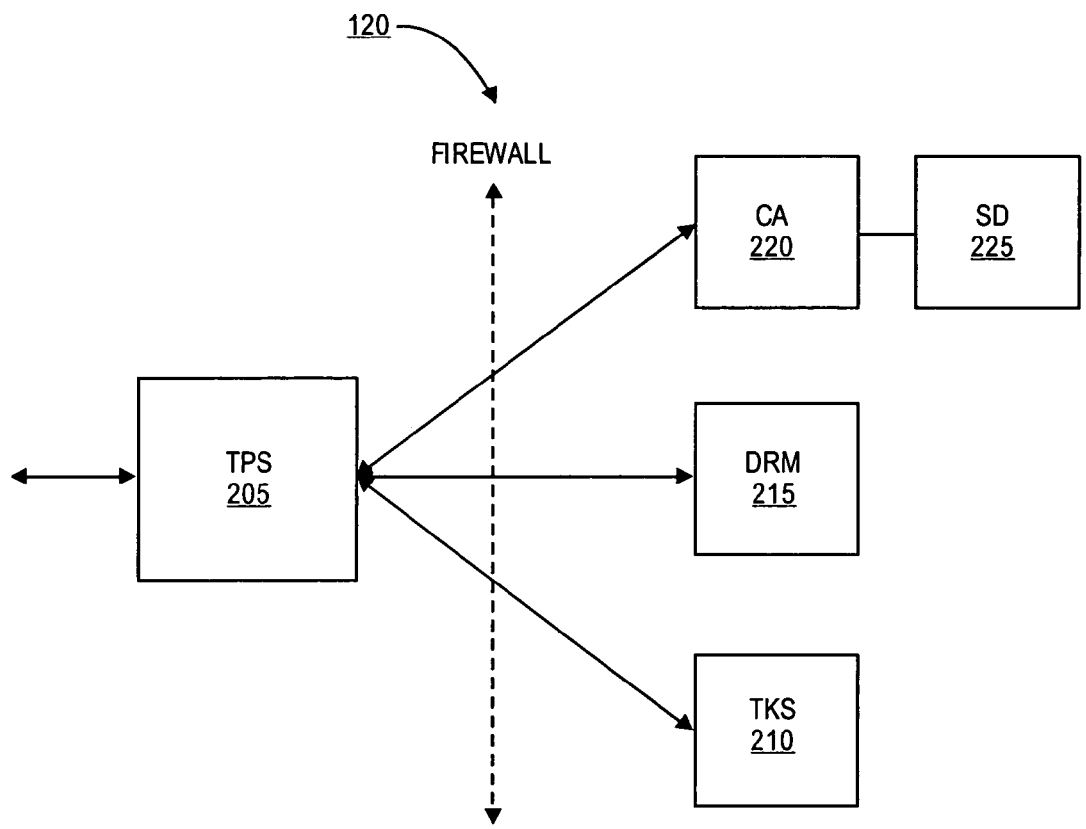
FIG. 2 illustrates an architectural diagram of the security client and server in accordance with another embodiment.

The token management system 120 comprises of several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215, a certificate authority (CA) module 220, and a security domain (SD) manager module 225. These components will now be briefly described.

The TPS 205 may be configured to act as a registration authority. The TPS 205 may direct the enrollment process. The TPS 205 may be configured to act a gateway between security clients 130 and tokens and the modules of the token management system 120.

In some embodiments, the TPS 205 provides a configurable profile-based scheme to handle enrollment requests by using a profile database. This database may be stored locally on the TPS 205 or may reside on another machine, such as a dedicated server which is then remotely coupled to the TPS 205. Such a scheme may be desirable where the TPS 205 is coupled to multiple sets of CAs, KRAs, and TKSs, and the like. For example, each enrollment request from client 110 may comprise a list of parameters, such as an ATR, a CUID, a key version, an applet version, and profile identifier. The TPS 205 may then match these parameters to one or more of its profiles. The TPS 205 may select a profile based on the matches of the profile to the parameters provided in the enrollment request. The profile then indicates various aspects of enrollment, such as the number of keys to generate on the token, the token label, and the connection information between the applicable CA, DRM, and TKS to be used for managing the client 110.

For example, upon receiving an enrollment request from one of clients 110, the TPS 205 will typically establish a secure communication channel with client 110. To do that, the TPS 205 may connect to the TKS 210, which has the master key for the client 110 that was used to create the keys on the token. Accordingly, the TPS 205 may query its profile database and determine which TKS to route the enrollment request. In addition, the TPS 205 may use its profile database to determine which CA to request a certificate and which DRM to use for key escrow. Of course other aspects of operations may be indicated in the profile framework used by the TPS 205.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210. For server side key generation requests, the manufacturer installed symmetric keys are replaced with the server generated keys which are derived the server master key. The TKS module 210 may also be configured to hold a public key of the DRM module 215 as a server transport key, STK, in an encrypted secure database.

The DRM module 215 may be configured to maintain a database of encrypted subject's private keys, which can be recovered on demand by an appropriate process. The DRM module 215 may also be configured to generate a subject public key (SPuK) and a subject private key (SPrivK), where the subject may represent a user, device, or other entity such as organization, association, etc. The DRM module 215 may be further configured to retrieve a storage key, SK. The storage key, SK, may be a private permanent storage key owned by the DRM module 215. The DRM module 215 may generate a storage session key, SSK, to encrypt the subject private key, SPrivK, with the storage session key, SSK, to arrive at a wrapped private key, SSK(SPrivK) and encrypt the storage session key, SSK, with the storage key, SK, to arrive at a wrapped storage session key, SK(SSK). These wrapped keys, SSK(SPrivK) and SK(SSK) are archived or escrowed for later recovery.

In general, CA module 220 is configured to issue and sign certificates. The CA module 220 may distribute and install certificates using well known Web protocols, such as HTML/HTTPS or XML/HTTPS. The CA module 220 may use the well-known standard RSA digital signatures. For example, the CA module 220 may be configured to generate certificates, such as X.509 certificates, in response to received subject public key information and certificate enrollment requests.

However, the SD module 225 may support customizable security policy templates that can be adapted for various certificate management policies and support automated online authentication checks against existing databases in token management system 120. In addition, the SD module 225 may support cross certification with other domains and/or systems, and thus, support the creation and cross signing of another SD module in another system (not shown). In some embodiments, profiles are provided to handle a variety of types of requests, such as enrollment request, pin-reset request, and format requests. Pin reset requests is where the end user request to reset the token password. A format request is where the end user requests to format his/her token. Of course, any type of requests may be handled by a profile. The SD module 225 may also distribute certificates and certificate revocation lists (CRLs) to LDAP-compliant servers, such as a directory server. As part of its services, the SD module 225 will typically be in communication with the other components of token management system 120 and other entities, such as a directory server (not shown).

In order to assist in protecting the services of the CA module 220, it may be elected the manager of a security domain. The SD module 225 serves as a centralized registry of services that may be utilized by the CA module 220 and others. For example, the CA module 220, the DRM module 215, and the TKS module 210 may register themselves with the SD module 225 to join the security domain. Each security domain has a domain manager. For example, CA module 220 can create a security domain and be elected as its manager. The SD module 225 may also store corresponding certificates for these components so that the CA module 220 can authenticate itself to the other components that it attempts to securely communicate with. In some embodiments, these modules may include software that automates their registration with the SD module 225. For example, the registration by these components may be performed upon startup or installation and at periodic intervals thereafter. Of course, this registration may be manually initiated by an administrator or some other authorized party.

In general, a security domain may be any group of entities that share a common set of policies and have some form of trust relationship. For example, a security domain may contain a set of services/subsystems such as a CA, a DRM, TKS, a OCSP and a TPS. Based on the registration, the SD module 225 may then provide a topology or list that indicates the network-based or trust-based topology of the security domain, such as the locations of components, the relationship between components. For example, an administrator or some other authorized party may utilize a browser application to access the SD module 225 and display the stored topology information.

The SD module 225 may also serve as a distribution point for security policies. A security policy may comprise any information that indicates, for example, a set of trusted certificate authorities, certificate templates, certificate revocation lists, and the locations of the services in the enterprise security system. Of note, the security policies may be arranged in various ways. For example, different security policies may share a peer-to-peer relationship or a parent-child relationship. Of course, other forms of relationships between security policies may be implemented by the SD module 225.

Accordingly, the SD module 225 provides a platform to automatically manage the security domains of token management system 120. Conventionally, an administrator of the token management system 120 would be required to manually configure the CA module 220 for secure communications with the other components of the token management system 120. However, with the use of the SD module 225, the CA module 220 may automatically discover the topology of the applicable security domain and commence communications with the other components. One skilled in the art will recognize that the security policy database may provide its information in a variety of forms that are LDAP-compliant or based on extensible markup language (XML).

In various embodiments, the TPS 205 may receive an enrollment request and CID from the security client 130. To establish a secure channel between TPS and the client, the TPS module 205 may forward the CID of the token 130 from the enrollment request to the TKS module 210. The TKS module 210 may be configured to derive a key encryption key, KEK, that is used in encrypting other secret keys intended for the specific token within the token management system 120. More particularly, the TKS module 120 may be configured to apply a pre-defined function is used to derive the key encryption key, KEK, based on the CID from the token 130. The TKS module 210 may also generate a key transport session key, KTSK. The TKS module 210 may encrypt the key transport session key (KTSK) with the key encryption key (KEK) to arrive at a first encrypted or wrapped key transport session key, KEK(KTSK). If the TPS profile determines that server-side key generation should be performed on the request, the TPS 205 will forward key generation request to the DRM module 215.

The TKS module 210 may retrieve a server transport key, STK, where the server transport key may be a public key issued by the DRM module 215. The TKS module 210 may wrap the key transport session key, KTSK, with a server transport key, STK, to arrive at a second wrapped key transport session key, STK(KTSK). The TKS module 210 may forward the first wrapped key transport session key, KEK(KTSK) and the second wrapped key transport session key STK(KTSK) to the TPS 205.

The TPS 205 may be configured to forward the second wrapped key transport session key, STK(KTSK) and the server-side key generation request to the DRM module 215 while temporarily holding the first wrapped key transport session key, KEK(KTSK). The DRM module 215 may be configured to generate an asymmetric key pair, i.e., a subject public and a private (SPuK/SPrivK) key pair in response to receiving a server-side key generation request, where the subject may represent a user, device or other entity such as an organization, association, etc.

The DRM module 215 may also be configured to retrieve a storage key, SK, which is a permanent private storage key owned by the DRM module 215 and to generate a storage session key, SSK. The DRM module 215 may then wrap the subject private key, SPrivK With the storage session key, SSK, i.e., STK(SPrivK) and wrap the storage session key,-SSK, with the storage key, SK, i.e., SK(SSK). The DRM module 215 may then archive or escrow these wrapped keys for later recovery in the event of a lost or destroyed token.

The DRM module 215 may be further configured to decrypt the second wrapped transport key, STK(KTSK), to obtain the key transport session key, KTSK with the complementary key of the of the server transport key used in the TKS module 210. The server transport key and its complementary key may be symmetric or asymmetric as long as they are shared between the DRM module 215 and the TKS module 210. The DRM module 215 may then wrap the subject private key, SPrivK, with the key transport session key, KTSK, as a wrapped private key, KTSK(SPrivK). The DRM module 215 may forward the wrapped private, key, KTSK(SPrivK) and the subject public key, SPuK, to the TPS 205.

The TPS 205 may forward the wrapped private key, KTSK(SPrivK) and the first wrapped key transport session key, KEK(KTSK), to the security client 130 to write into the token. The forwarded wrapped keys (KEK(KTSK) and KTSK(SPrivK)) are received at the token to be injected therein. For the sake of completeness, the token may execute an applet that can retrieve the key encryption key. Accordingly, the applet may unwrap the first wrapped key transport session key, KEK(KTSK) to retrieve the key transport session key, KTSK. The applet then uses the key transport session key, KTSK, to unwrap the wrapped private key, KTK(SPrivK) to retrieve the subject private key, SPrivK. SPuK can either be injected or derived from SPrivK.

The TPS 205 may be further configured to send a certificate enrollment request along with information related to the subject public key, SPuK, to the CA module 220 for certificates for the token. The TPS 205 may subsequently forward received certificates from the CA module 220 to the security client 130. Subsequently, the certificates are written into the token.

Figure 3:
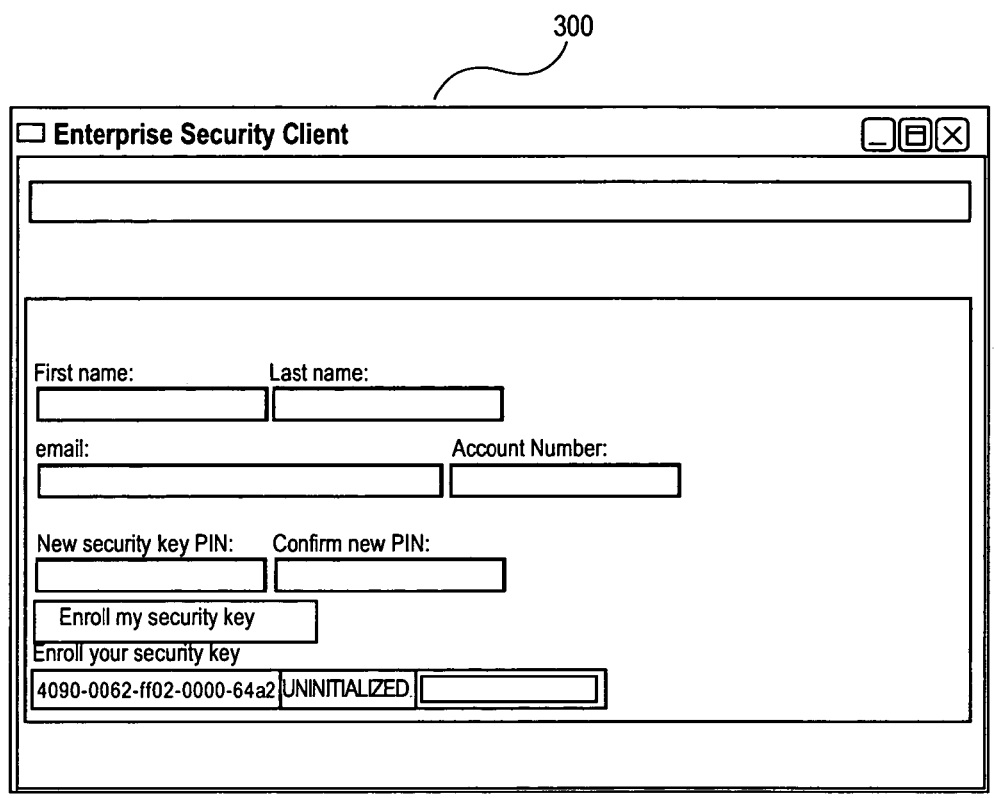
FIGS. 3-5 illustrate an exemplary process for automatically enrolling token in accordance with yet another embodiment.
Figure 4:
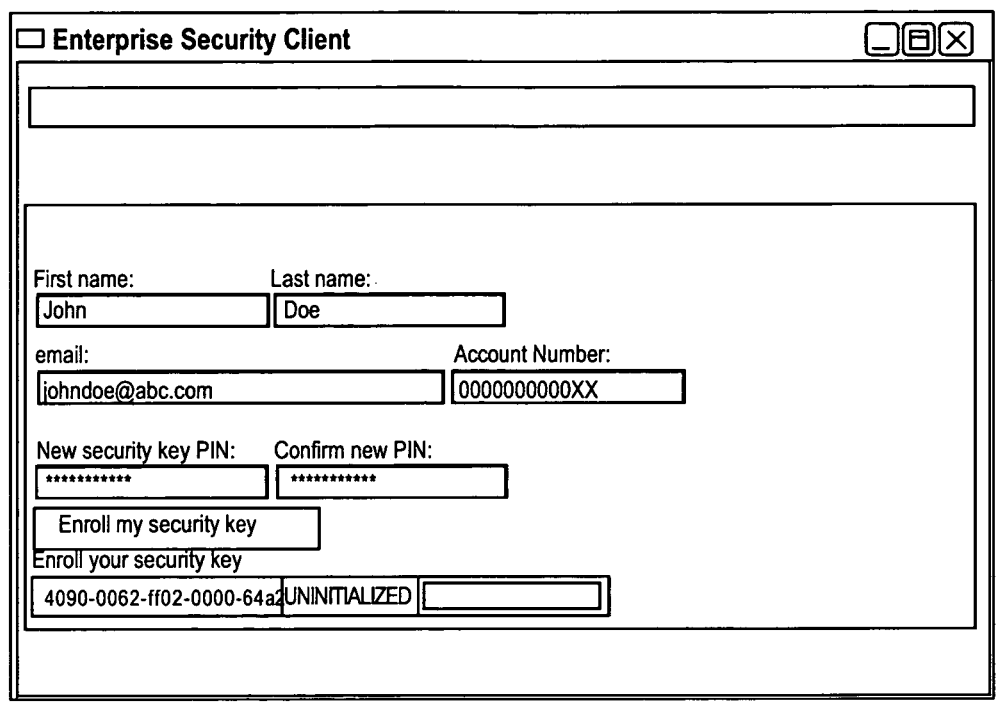
Figure 5:
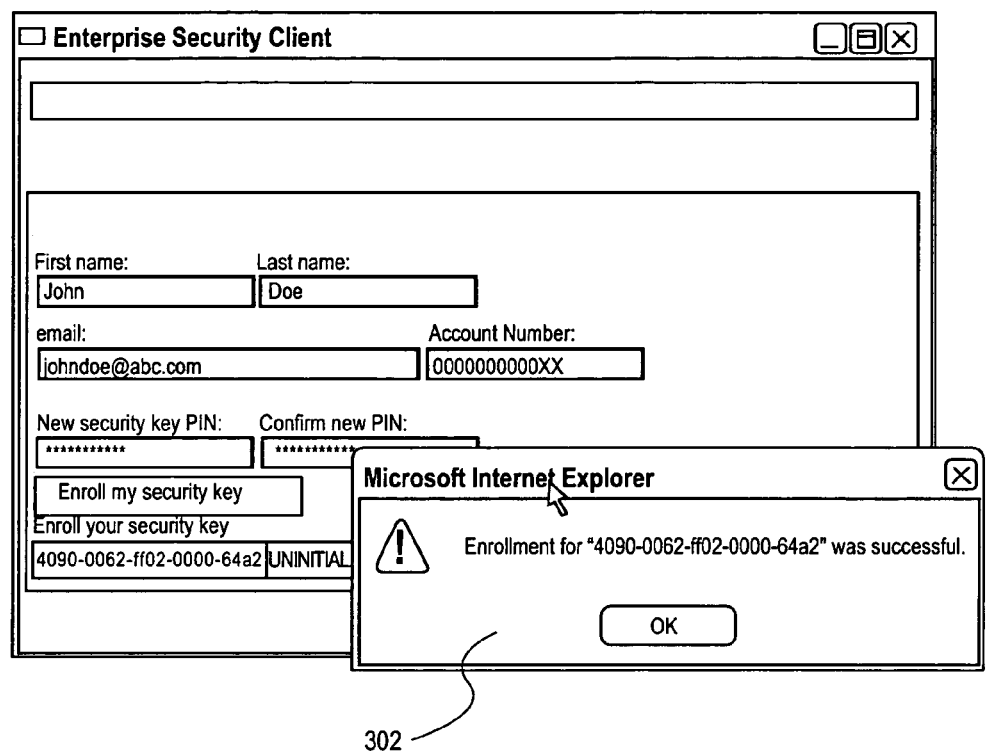

FIGS. 3-5 illustrate an exemplary process for automatically enrolling token 125 in accordance with embodiments of the present invention. In particular, FIGS. 3-5 illustrate exemplary screen shots that may be provided at client 110 by security client 125 when the user attempts to enroll the token 125. As can be seen from the screenshots of FIGS. 3-5, the user has very little (or no) input required of them other than inserting token 125. In some embodiments, this level of automation may be provided based on the configuration of token management system 120, for example, based on the profile framework of the TPS 205 and the security domain utilized the CA module 220.

The process flow shown in FIGS. 3-5 may be triggered by the user inserting the token 125 into client 110. Client 110 may then detect the token 125 and invoke the security client 130 to begin its processing. Since the user needs to enroll the token 125, the security client 130 may read various pieces of information. For example, the security client 130 may determine a location of the TPS 205, such as URL, as well as other authentication information.

Referring now to FIG. 3, an initial screenshot of the security client 130 is shown that may be provided when the token 125 has been inserted. In particular, a dialog box 300 is shown comprising various fields, such as fields for a first name, a last name, an email address, an account number. Of course, one skilled in the art will recognize that any information may be requested from the user in order to authenticate them.

In FIG. 4, the user proceeds with the enrollment process by providing a personal identification number (or password) and confirming it by repeating its entry. The user may then submit this information to the TPS 205 in order to enroll the token 125. The security client 130 may provide this information to TPS 205 and the various actions for enrolling the token 125 may be performed by token management system 120. For example, TPS 205 may perform a profile lookup and also obtain a certificate from the CA module 220. The TPS 205 may then return various credentials, such as its encryption keys, to complete the enrollment of the token 125.

In FIG. 5, the security client 130 indicates that it has completed the enrollment by displaying a dialog box that indicates the enrollment was successful. Of course, other messages, such as a warning message or failure message, may also be provided as the enrollment progresses.

Accordingly, as can be seen from FIGS. 3-5, the user was able to complete their enrollment with virtually no actions, other than entering some basic information. One skilled in the art will recognize that this type of automated process will render enrollment of the token 125 much easier than the known technologies and systems.

Figure 6:
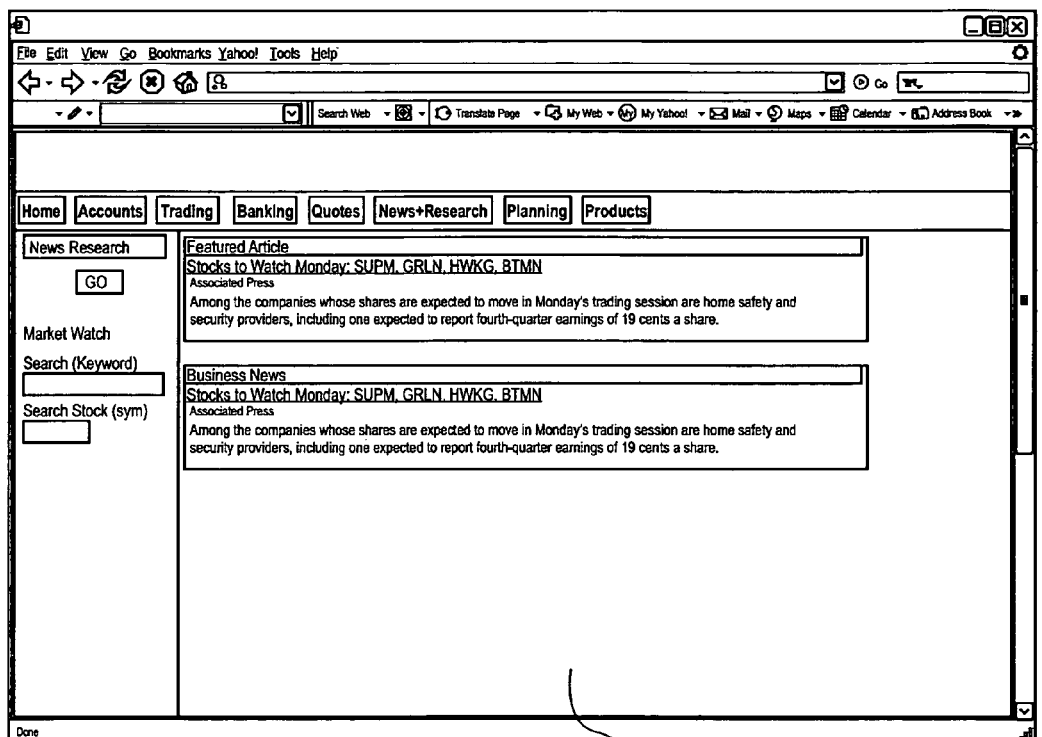
FIGS. 6-10 illustrate an exemplary process for a user logging in with their token for a website in accordance with yet another embodiment.

FIGS. 6-10 illustrate an exemplary process for a user logging in with the token 125 for a website. Once the user has enrolled the token 125, embodiments of the present invention may accommodate its use in an easy manner. For example, as shown in FIG. 6, the user at client 110 has browsed to a website 304. Of course, the website 304 may be any website or application that the user wishes to operate. For purposes of explanation, the website 304 is shown as a website that displays a person's financial information.

Figure 7:
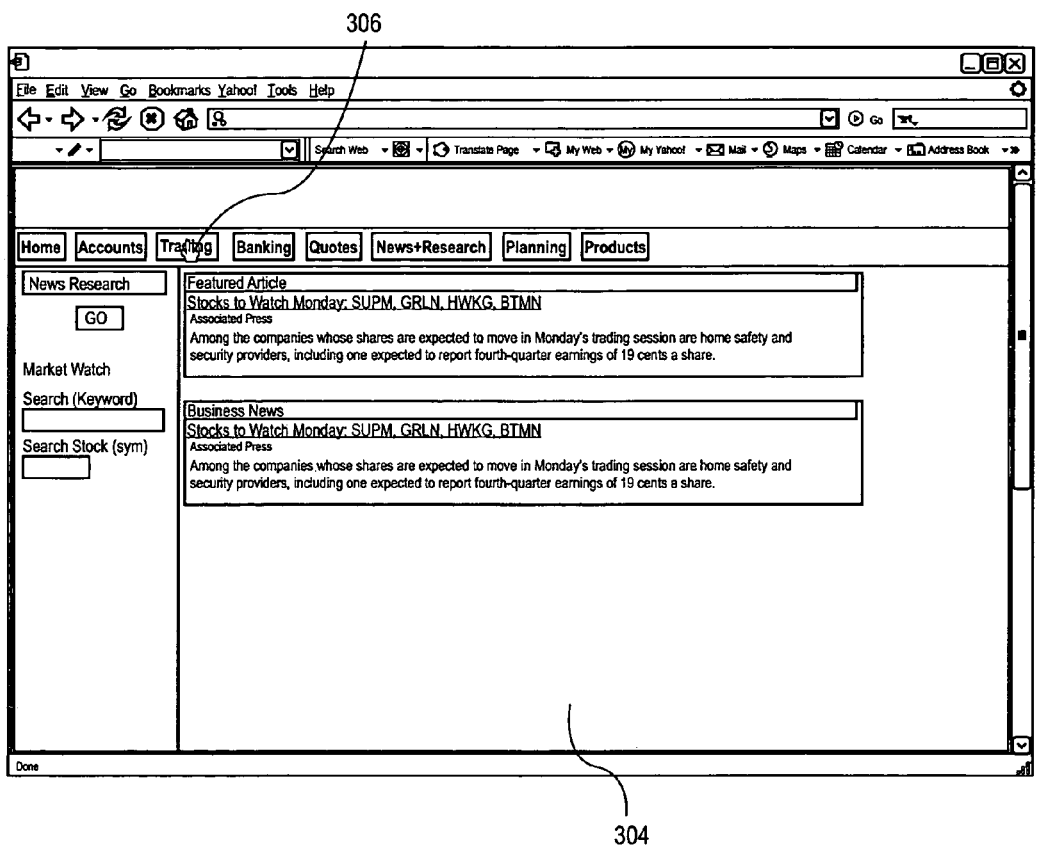
Figure 8:
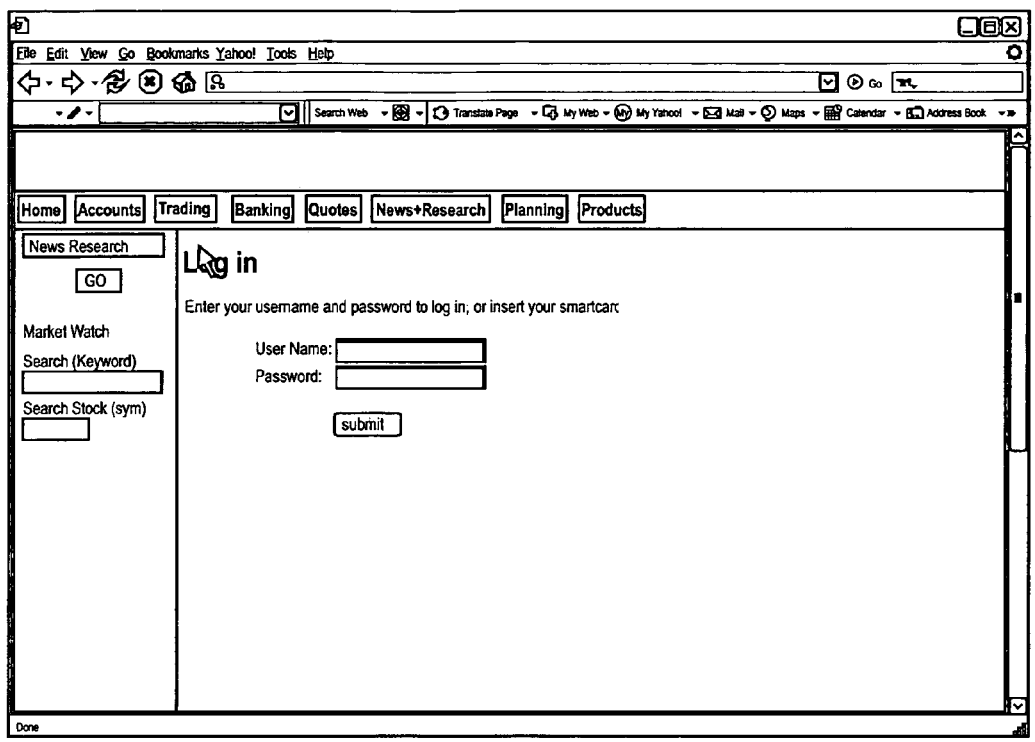

In FIG. 7, the user has indicated a desire to navigate to their trading account. Hence, the user has selected button 306 for "Trading" in the website 304. In response, this action may invoke security client 130, since the information in such an area may be secured. Accordingly, in FIG. 8, the website 304 displays a login page that requests some authentication information from the user. Alternatively, the website 304 may prompt the user to enter the token 125 in lieu of or in addition to the login page.

Figure 9:
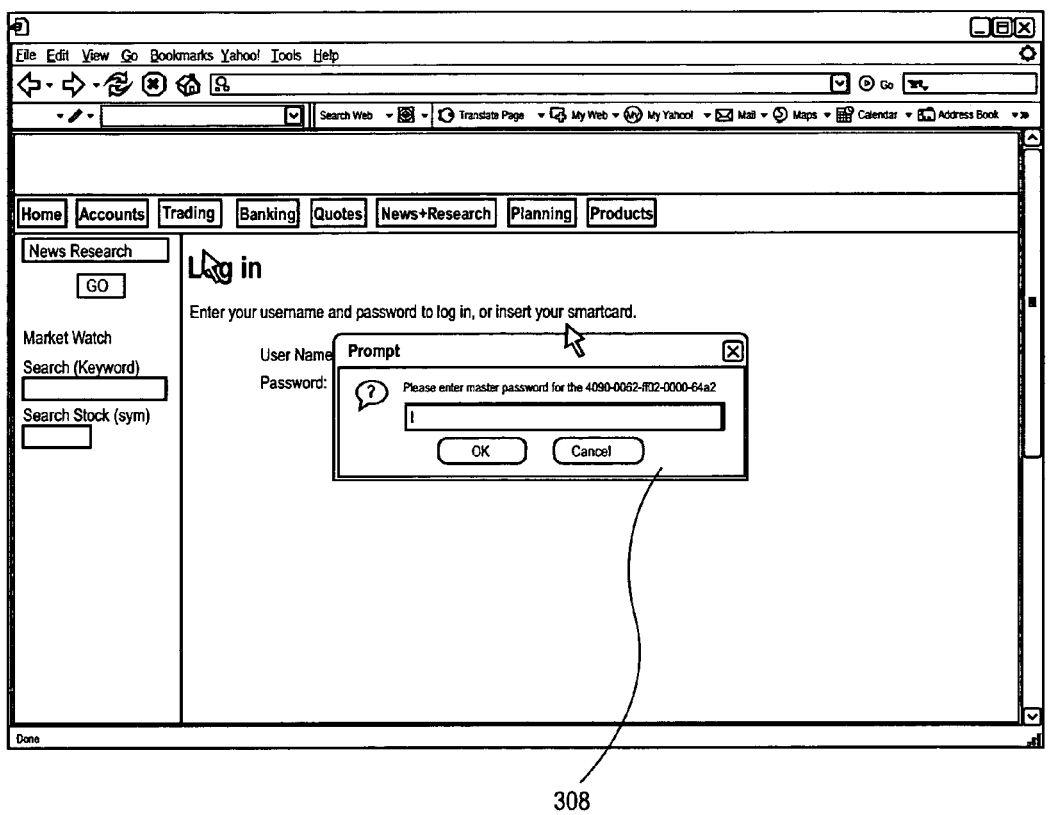

However, rather than manually inputting a login and password, the user may electively insert the token 125 as their authentication proof. In response, as shown in FIG. 9, the security client 130 may display a dialog box 308 that confirms the user's use of the token 125. As optionally shown, the dialog box 308 may also request a password for authorizing the use of the token 125. Of course, one skilled in the art will recognize that the user may simply be provided a notification and processing may continue. That is, the security client 130 may retrieve the authentication information from the token 125 and submit this to the website 304.

Figure 10:
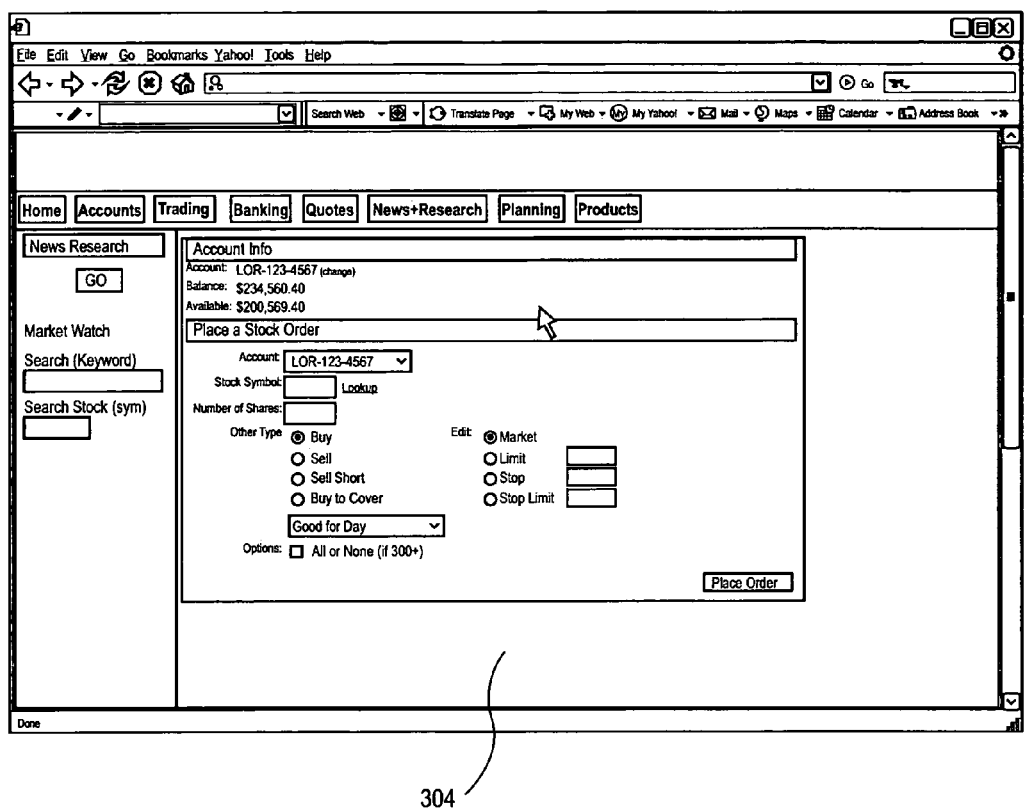

As shown in FIG. 10, the website 304 has accepted the authentication of the user from the token 125 and thus the user may now view their information in the trading section of the website 304. Since the user has been authenticated, the user may now have unlimited access to other portions of their account. Alternatively, the user may also be prompted each time they navigate to various secure portions of the website 304. In addition, the user may be required to maintain the token 125 in connection with the client 110.

Hence, if the user disconnects the token 125, then the website 304 may immediately revoke the authentication of the user. Of course, the user's authentication may be flexible and allow for the disconnection of the token 125. The user may be required to periodically reconnect the token 125 in order to maintain or reestablish their authentication. Other variations in this operation will be apparent to those skilled in the art.

Accordingly, in a similar fashion to the enrollment process, the user was allowed to easily authenticate their identity using the token 125 with very little action. Embodiments of the present invention can thus provide a wide spectrum of automation that permits the user to authenticate themselves with almost no action or input. The level of input requested from the user may be varied, of course, depending on the sensitivity of the information requested or the security level of the resources being accessed.

Figure 11:
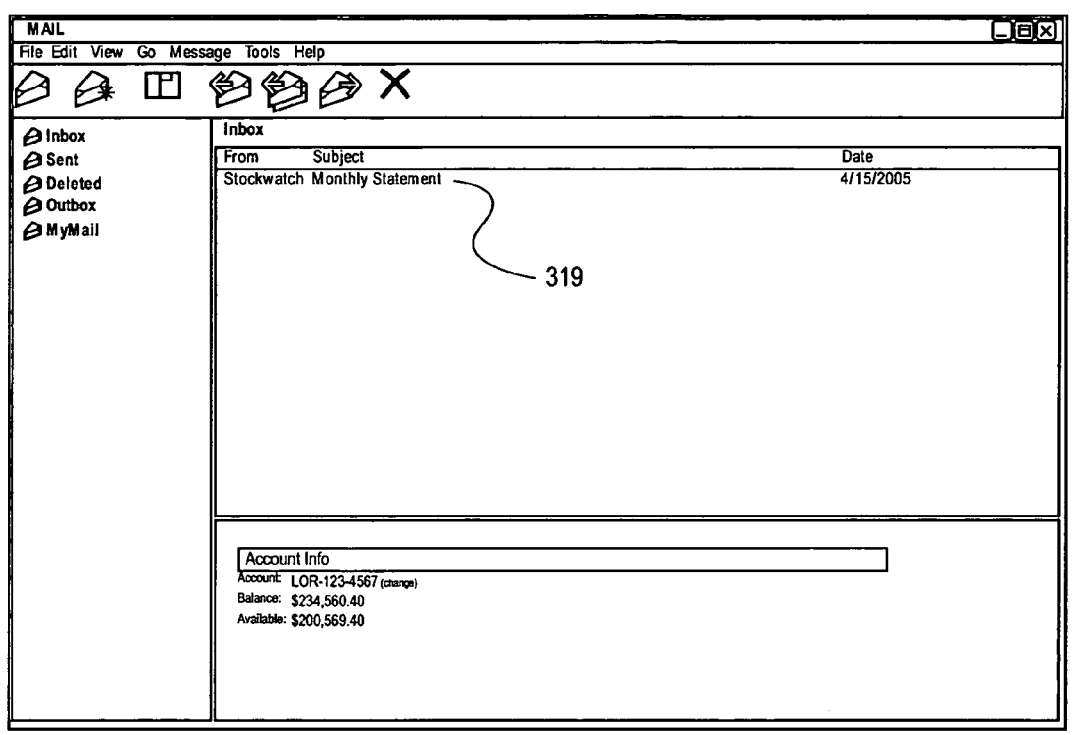
FIGS. 11-14 illustrate an exemplary process for a user logging in with their token for an email in accordance with yet another embodiment.

FIGS. 11-14 illustrate an exemplary process for a user logging in with their token for an email in accordance with yet another embodiment. As shown, a user may have occasion to receive an email 310 that includes sensitive information. For example, as shown in FIG. 11, the user has received an email 310 with their monthly statement.

Figure 12:
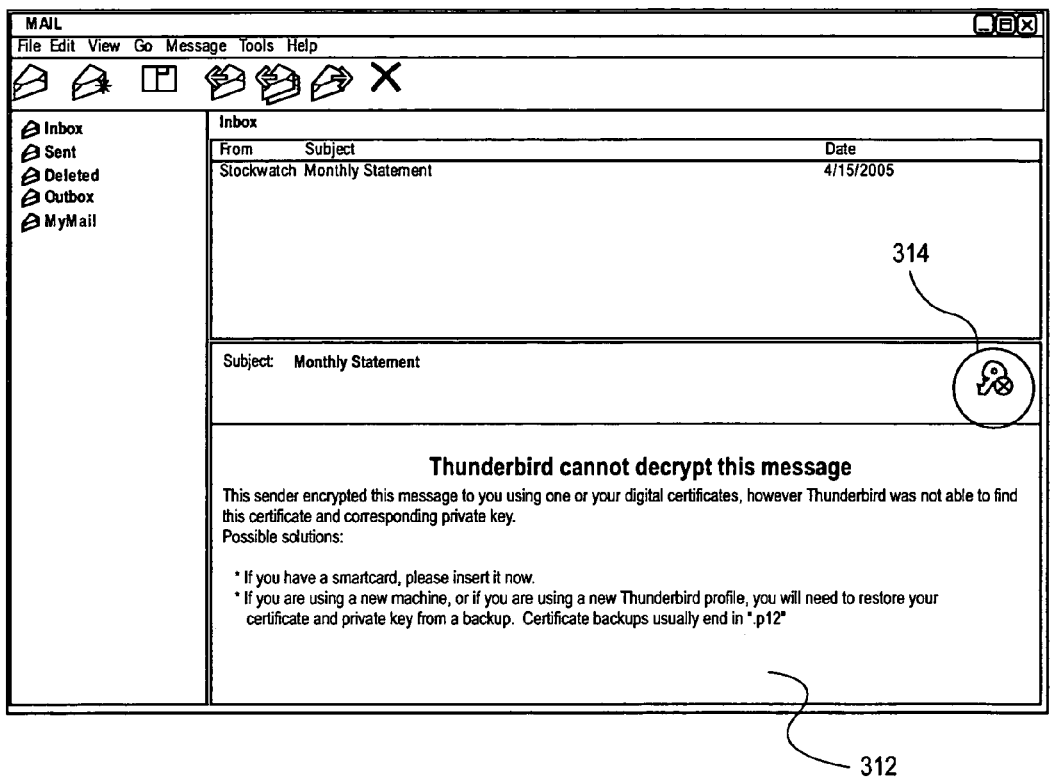

In FIG. 12, the user has then attempted to read the email 310. However, since the user has not previously authenticated themselves the email 310 is shown as unreadable in window 312. In addition, a icon 314 may be displayed to indicate that authentication and decryption are needed in order to read the email 310.

Figure 13:
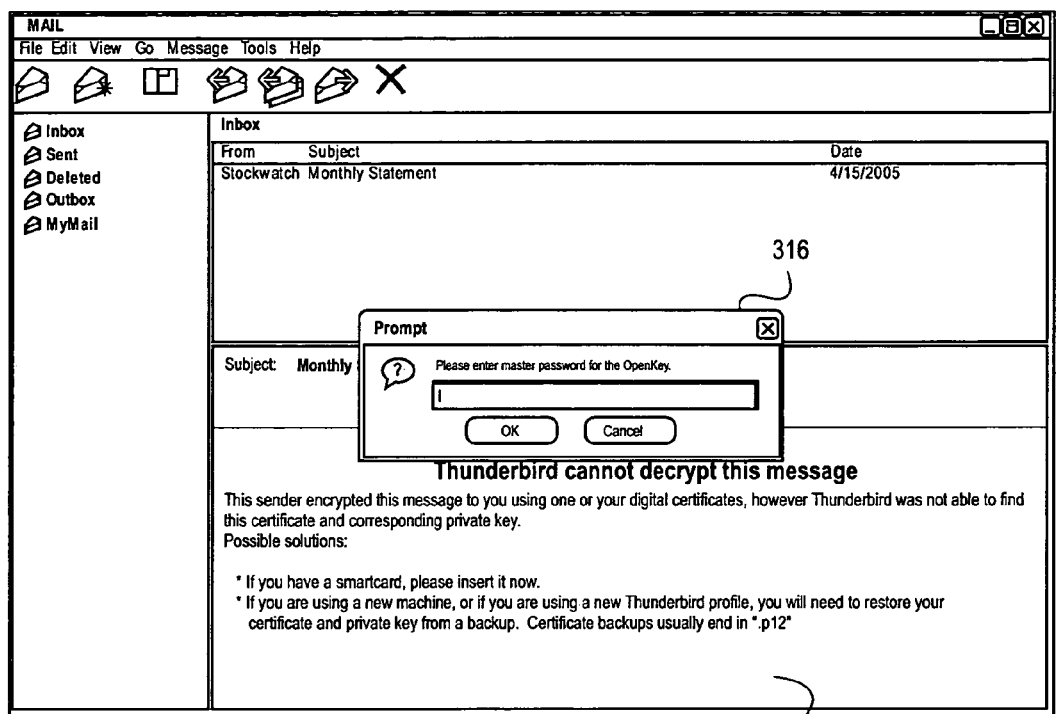

Consequently, as shown in FIG. 13, the user has inserted their token 125 and a dialog box 316 may optionally be displayed. In the embodiment shown, the dialog box 316 is provided to request a confirmation password as further proof of authentication. Of course, one skilled in the art will recognize that this input may be unnecessary and instead the user may simply be informed that the token 125 has been recognized and acknowledged. This allows embodiments of the present invention to provide a wide range of automation to make the user's experience more efficient.

Figure 14:
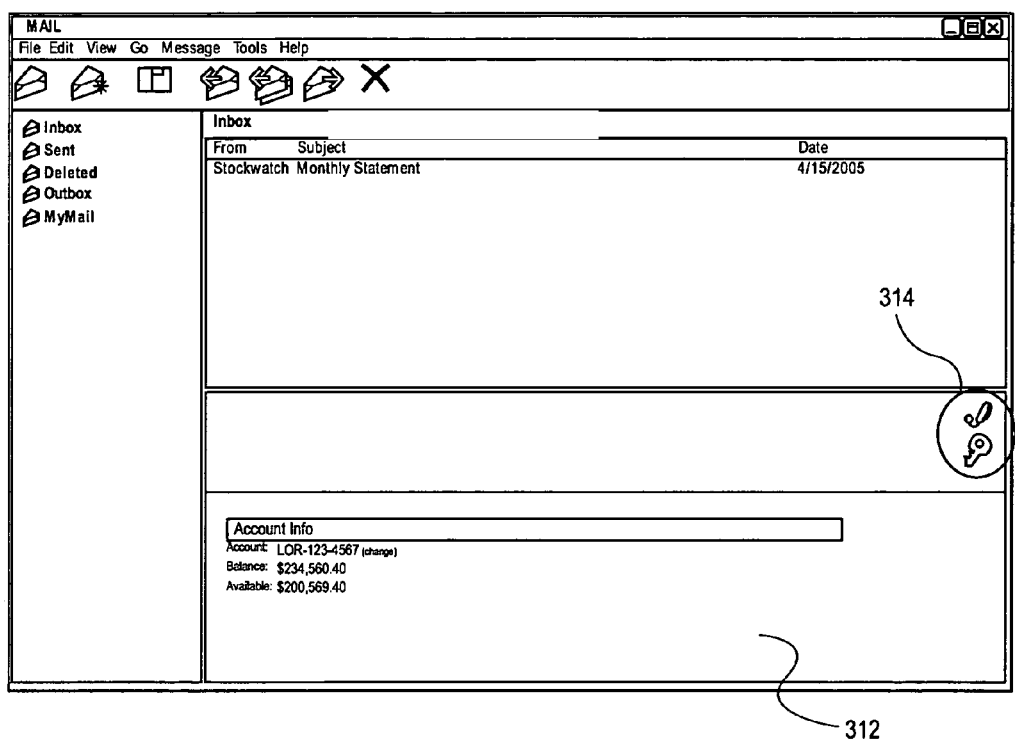

In FIG. 14, the token 125 has been recognized, and thus, the email 310 can now be decrypted. Accordingly, window 312 now shows the email 310 in readable form. In addition, the icon 314 may be modified to indicate that the user has been authenticated. The user may then be required to keep the token 125 connected to the client 110. Hence, if the token 125 is pulled from the client 110, the authentication of the user may be immediately revoked and the email may revert to its encrypted state as shown in FIG. 12. Of course, the user's authentication may be flexible and allow for the disconnection of the token 125. The user may be required to periodically reconnect the token 125 in order to maintain or reestablish their authentication. One skilled in the art will recognize that similar operations may be automated.

Figure 15:
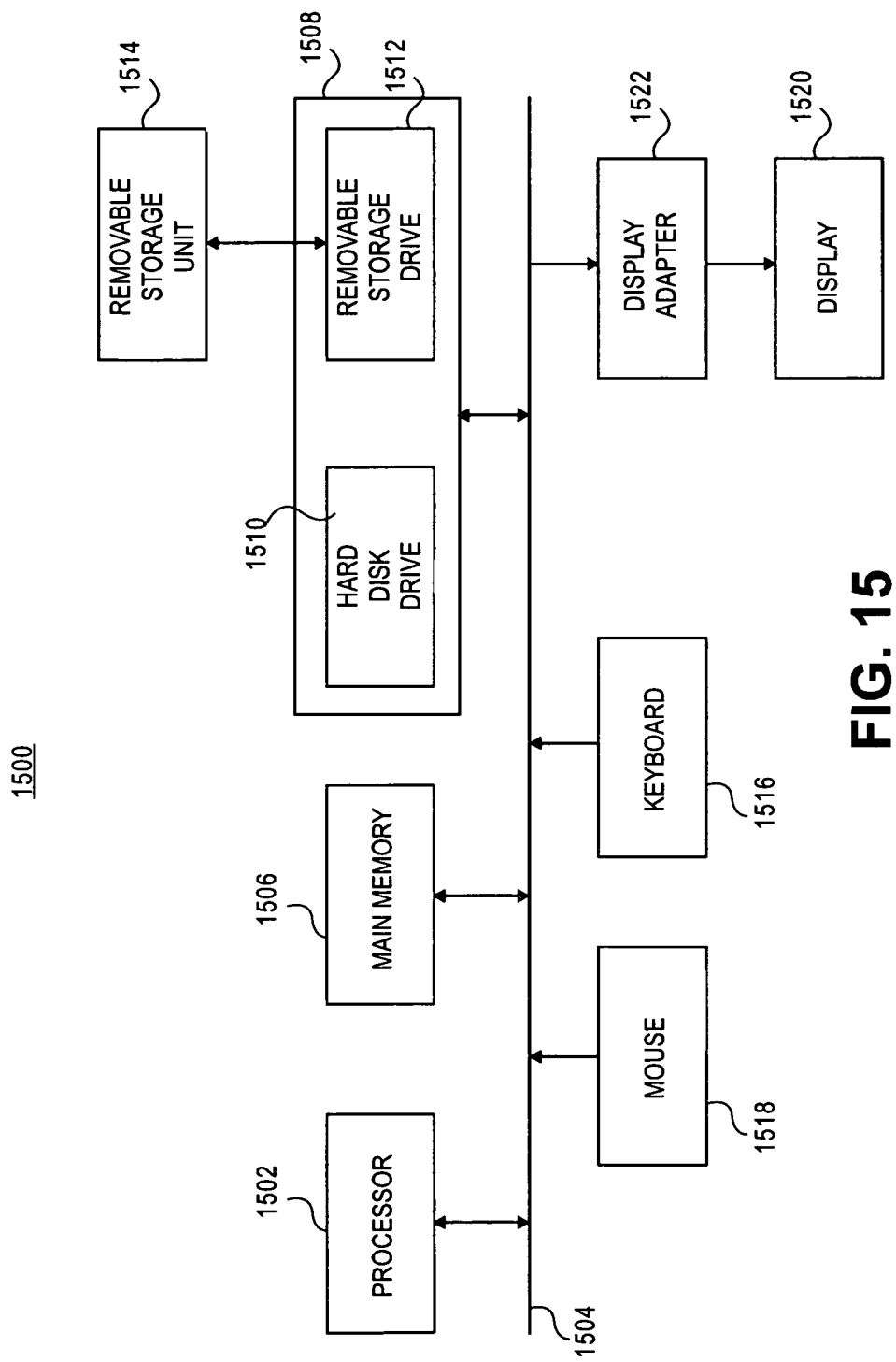
FIG. 15 illustrates an exemplary computing machine.

FIG. 15 illustrates an exemplary block diagram of a computing platform 1500 where an embodiment may be practiced. The functions of the security client and token management system may be implemented in program code and executed by the computing platform 1500. The security client and token management system may be implemented in computer languages such as PASCAL, C, C++, JAVA, etc.

As shown in FIG. 15, the computer system 1500 includes one or more processors, such as processor 1502 that provide an execution platform for embodiments of the security client and token management system. Commands and data from the processor 1502 are communicated over a communication bus 1504. The computer system 1500 also includes a main memory 1506, such as a Random Access Memory (RAM), where the security client and token management system may be executed during runtime, and a secondary memory 1508. The secondary memory 1508 includes, for example, a hard disk drive 1510 and/or a removable storage drive 1512, representing a floppy diskette drive, a magnetic tape drive, a compact disk drive, etc., where a copy of a computer program embodiment for the security client and token management system may be stored. The removable storage drive 1512 reads from and/or writes to a removable storage unit 1514 in a well-known manner. A user interfaces with the security client and token management system with a keyboard 1516, a mouse 1518, and a display 1520. The display adapter 1522 interfaces with the communication bus 1504 and the display 1520 and receives display data from the processor 1502 and converts the display data into display commands for the display 1520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

What is claimed is:

1. A method comprising:
    detecting a presence of a token by a security client;
    receiving, by the security client, an input parameter associated with the token;
    sending, by the security client to a token management system, the input parameter and a card identification associated with the token, wherein the card identification uniquely identifies the token;
    selecting, by a processor of the token management system, a first token enrollment profile of a plurality of profiles in view of the input parameter and the card identification, the first token enrollment profile defining a plurality of aspects to enable enrollment of the token; and
    enrolling the token, by the token management system, in view of the plurality of aspects defined by the first token enrollment profile, without user input to perform the enrollment, wherein the enrollment of the token comprises obtaining a token certificate from a certificate authority identified in view of the token enrollment profile.

2. The method of claim 1, wherein receiving the input parameter comprises receiving an input that confirms a request to enroll the token.

3. The method of claim 1, wherein receiving the input parameter comprises receiving information that identifies a user.

4. The method of claim 1, wherein receiving the input parameter comprises receiving a password.

5. The method of claim 1, wherein the plurality of aspects of the enrollment of the token comprise two or more of a number of keys to generate on the token, a token label, or connection information between an applicable certificate authority, data recovery manager, or token key service associated with the security client.

6. A system comprising:
a memory to store a first token enrollment profile; and
a processor operatively coupled to the memory, the processor to:
 detect a presence of a token by a security client executed by the processor;
 receive, by the security client, an input parameter associated with the token;
 send, by the security client to a token management system, the input parameter and a card identification associated with the token, wherein the card identification uniquely identifies the token;
 select, by the token management system, the first token enrollment profile of a plurality of profiles in view of the input parameter and the card identification, the first token enrollment profile defining a plurality of aspects to enable enrollment of the token; and
 enroll the token, by the token management system, in view of the plurality of aspects defined by the first token enrollment profile, without user input to perform the enrollment, wherein the enrollment of the token comprises obtaining a token certificate from a certificate authority identified in view of the token enrollment profile.

7. The system of claim 6, wherein the plurality of aspects of the enrollment of the token comprise two or more of a number of keys to generate on the token, a token label, or connection information between an applicable certificate authority, data recovery manager, or token key service associated with the security client.

8. A non-transitory computer-readable medium comprising instructions that, when executed by a processor, cause the processor to:
 detect a presence of a token by a security client executed by the processor;
 receive, by the security client, an input parameter associated with the token;
 send, by the security client to a token management system, the input parameter and a card identification associated with the token, wherein the card identification uniquely identifies the token;
 select, by the token management system, the first token enrollment profile of a plurality of profiles in view of the input parameter and the card identification, the first token enrollment profile defining a plurality of aspects to enable enrollment of the token; and
 enroll the token, by the token management system, in view of the plurality of aspects defined by the first token enrollment profile, without user input to perform the enrollment, wherein the enrollment of the token comprises obtaining a token certificate from a certificate authority identified in view of the token enrollment profile.

9. The non-transitory computer readable medium of claim 8, wherein the plurality of aspects of the enrollment of the token comprise two or more of a number of keys to generate on the token, a token label, or connection information between an applicable certificate authority, data recovery manager, or token key service associated with the security client.

* * * * *